(12) United States Patent
Fenn

(10) Patent No.: US 12,078,577 B2
(45) Date of Patent: Sep. 3, 2024

(54) SECTIONING MACROTOME

(71) Applicant: BRIGHT INSTRUMENT CO. LIMITED, Luton (GB)

(72) Inventor: Mark Fenn, Luton (GB)

(73) Assignee: BRIGHT INSTRUMENT CO. LIMITED, Bedfordshire (GB)

( * ) Notice: Subject to any disclaimer, the term of this patent is extended or adjusted under 35 U.S.C. 154(b) by 811 days.

(21) Appl. No.: 16/975,640

(22) PCT Filed: Feb. 13, 2019

(86) PCT No.: PCT/GB2019/050382
§ 371 (c)(1),
(2) Date: Aug. 25, 2020

(87) PCT Pub. No.: WO2019/166767
PCT Pub. Date: Sep. 6, 2019

(65) Prior Publication Data
US 2020/0408647 A1    Dec. 31, 2020

(30) Foreign Application Priority Data
Feb. 28, 2018    (GB) ...................... 1803310

(51) Int. Cl.
*G01N 1/06*    (2006.01)
(52) U.S. Cl.
CPC ......... *G01N 1/06* (2013.01); *G01N 2001/061* (2013.01)
(58) Field of Classification Search
CPC .. G01N 1/06; G01N 1/04; G01N 1/02; G01N 2001/061; G01N 2001/065; G01N 2001/066
See application file for complete search history.

(56) References Cited

U.S. PATENT DOCUMENTS 3,975,977 A    8/1976  Mörnberg
4,502,358 A *  3/1985  Behme ................. B26D 1/10
                                                 144/155

(Continued)

FOREIGN PATENT DOCUMENTS

CN    1991329 A    4/2007
CN    103237618 A  8/2013

(Continued)

OTHER PUBLICATIONS

Office Action for corresponding Chinese Patent Application No. 201980028881.9, mailed Feb. 22, 2023 (10 sheets).

(Continued)

*Primary Examiner* — Matthew D Krcha
*Assistant Examiner* — Tingchen Shi
(74) *Attorney, Agent, or Firm* — Lewis Roca Rothgerber Christie LLP

(57) ABSTRACT

A sectioning apparatus (1) for sectioning frozen tissue specimens, the apparatus (1) comprising: a frame (2) comprising two opposing side walls (3a, 3b) extending in a longitudinal direction (L) of the apparatus (1); a blade unit (6) mounted between the side walls (3a, 3b) of the frame (2) in a transverse direction (T) of the apparatus (1); a clamping unit (7) integral with or fixed to each side wall (3a, 3b) of the frame (2) that is adapted to clamp one end of the blade unit (6); a specimen stage (8) for mounting a tissue specimen; a drive mechanism for providing relative movement between the specimen stage (8) and the blade unit (6) in use of the apparatus (1); wherein the clamping unit (7) has a dimension in the transverse direction (T) that is greater than a dimension of the side wall (3a,3b) of the frame (2) in the transverse direction (T).

14 Claims, 10 Drawing Sheets

(56) References Cited

U.S. PATENT DOCUMENTS

| | | | |
|---|---|---|---|
| 5,533,342 | A | 7/1996 | Gordon |
| 6,921,840 | B1 | 7/2005 | Kung |
| 8,087,334 | B2 | 1/2012 | Miyatani et al. |
| 8,198,083 | B1 | 6/2012 | Loudon et al. |
| 9,475,123 | B2 | 10/2016 | Sevdic et al. |
| 10,029,313 | B2 | 7/2018 | Kaufmann |
| 2003/0152962 | A1 | 8/2003 | Price |
| 2014/0024599 | A1 | 1/2014 | Chen et al. |
| 2015/0144490 | A1 | 5/2015 | Deisseroth et al. |
| 2018/0126581 | A1* | 5/2018 | Jacko .................. B26D 7/2614 |

FOREIGN PATENT DOCUMENTS

| | | | |
|---|---|---|---|
| CN | 105710400 A | 6/2016 | |
| CN | 205404151 U | 7/2016 | |
| JP | 850078980 A | 6/1975 | |
| JP | 2002031586 A * | 1/2002 | |
| JP | 2003048193 A | 2/2003 | |
| JP | 2007178287 A | 7/2007 | |
| WO | WO2006039396 A2 | 4/2006 | |
| WO | WO2010033762 A1 | 3/2010 | |
| WO | WO-2016016795 A1 * | 2/2016 | ............... G01N 1/06 |

OTHER PUBLICATIONS

Office Action for corresponding Japanese Patent Application No. 2020-545696, mailed Feb. 7, 2023 (10 sheets).
International Search Report issued on May 27, 2019 in PCT/GB2019/050382, 4 pages.
Written Opinion of the International Searching Authority issued May 27, 2019 in PCT/GB2019/050382, 6 pages.
Search Report dated Aug. 26, 2018 issued in GB1803310.0, 1 sheet.

* cited by examiner

SECTIONING MACROTOME

CROSS-REFERENCE TO RELATED APPLICATIONS

This application is a National Phase Patent Application and claims priority to and the benefit of PCT/GB2019/050382 filed Feb. 13, 2019, which claims priority to and the benefit of GB Patent Application No. 1803310.0 filed Feb. 28, 2018, the entire contents of both of which are incorporated herein by reference.

The present invention relates to an apparatus for sectioning tissue specimens and in particular, but not exclusively, to an apparatus for sectioning large, frozen tissue specimens such as a human brain.

A microtome is an apparatus for producing extremely thin sections from tissue specimens, typically having a thickness of the order of microns, which may subsequently be used for microscopic analysis. Microtomes commonly comprise a cutting blade and a sample holder on which a tissue specimen is mounted. Relative movement of the tissue specimen across the blade results in the cutting of the sample. A section of tissue having a desired thickness may be cut by adjusting the position of the sample holder relative to the blade (or vice versa).

Water-rich tissues may be sectioned using a microtome mounted within a cryogenic refrigeration device (cryostat microtome). Tissue specimens are frozen to temperatures of −20 to −30° C. and the hardened frozen specimens are subsequently sectioned under cryogenic conditions. This procedure allows relatively fast sectioning, useful in rapid medical diagnostic applications, however suffers drawbacks relating to the quality of the samples produced thus limiting the application of such devices for research purposes.

In medical research applications, it may be desirable to produce whole sections of large tissue samples, such as a human brain, for example. Whilst numerous procedures are known for sectioning relatively small tissue specimens, which employ a variety of microtome apparatuses, there remains a challenge in sectioning such large tissue samples. The specimen may, for example, be divided into smaller pieces prior to sectioning, however this does not allow a full cross section of the specimen to be obtained.

Apparatuses specifically designed for sectioning large tissue specimens are commonly known as macrotomes, however producing whole sections of large tissue specimens having the necessary quality for subsequent analysis presents a particular challenge. Large specimens are more prone to crinkling, folding, tearing and other such defects than smaller specimens, such problems being exacerbated in a sectioning apparatus such as a cryostat microtome or a cryostat macrotome owing to the hardness of the frozen tissue sample and the forces experienced by the blade during cutting.

For example, existing sectioning apparatus comprise a blade mounted into pillar-type supports, which extend substantially above the main body of the apparatus. Such pillar-type supports are prone to deflection at the top as a result of the forces exerted on the blade during the sectioning operation. This leads to backlash and general destabilisation of the pillar-type supports, and thus the blade, during sectioning, which results in significant defects being formed in the sections of tissue being cut.

The present invention arose in an attempt to provide an improved apparatus for sectioning large, frozen tissue specimens.

According to the present invention, there is provided an apparatus for sectioning frozen tissue specimens, the apparatus comprising: a frame comprising two opposing side walls which extend in a longitudinal direction of the apparatus; a blade unit mounted between the side walls of the frame in a transverse direction of the apparatus; a clamping unit integral with or fixed to each side wall of the frame that is adapted to clamp one end of the blade unit; a specimen stage for mounting a tissue specimen; a drive mechanism for providing relative movement between the specimen stage and the blade unit in use of the apparatus; wherein the clamping unit has a dimension in the transverse direction that is greater than a dimension of the side wall of the frame in the transverse direction.

The sectioning apparatus may be a macrotome apparatus or a microtome apparatus. It is preferably a macrotome apparatus. Whilst the sectioning apparatus is suitable for sectioning frozen tissue specimens, it is also suitable for sectioning non-frozen tissue specimens.

The relative movement provided by the drive mechanism may be in at least one of a substantially horizontal direction, a substantially vertical direction and a substantially oblique direction.

The blade unit of the present invention comprises a blade suitable for sectioning frozen tissue specimens. The blade may be formed from a large number of known materials which are suitable for tissue sectioning applications, such as steel, high carbon steel or tungsten, for example. Steel blades may be hardened, and may also be subsequently tempered. For example, a steel blade may be hardened to a Rockwell hardness of 64, and may subsequently be tempered to a Rockwell hardness of 63. The blade unit may further comprise a retaining member (e.g. a collar) at each end of the blade adapted to be clamped by corresponding clamping units.

The blade may comprise, in use, opposing upper and lower surfaces. Preferably, a portion of the upper surface is substantially parallel to at least a portion of the lower surface. At least one of the upper surface and the lower surface of the blade comprises a bevelled portion which is angled towards the opposing upper or lower surface, such that the point at which the bevelled portion of the upper surface meets the lower surface defines a cutting edge of the blade. In some embodiments, the lower surface is substantially planar and the blade has a cross-sectional profile which is 'wedge' or 'chisel' shaped. In alternative embodiments, the upper surface and the lower surface both comprise bevelled portions and the blade has a substantially 'V' shaped cross sectional profile, for example.

The thickness of the blade (namely, the dimension of the blade between the upper surface and the lower surface) may preferably be at least 16 mm at its thickest point. More preferably the thickness of the blade is at least 20 mm at its thickest point. Most preferably, the thickness of the blade is at least 25 mm at its thickest point. Preferably, the blade comprises a body portion located behind the cutting edge having a thickness between the opposing upper and lower surfaces of at least 16 mm in a preferred embodiment, more preferably of at least 20 mm, and most preferably of at least 25 mm. The body portion may extend across only a portion of the length of the blade, or alternatively may extend along the entire length of the blade.

The length of the blade is preferably greater than 200 mm, more preferably greater than 300 mm and most preferably greater than 400 mm. The length of the cutting edge is preferably greater than 100 mm, more preferably greater than 150 mm and most preferably greater than 200 mm.

The blade may further comprise a back surface extending between the upper surface and the lower surface at an edge of each surface which is opposed to the cutting edge. The width of the blade from the cutting edge to the back surface is preferably greater than 50 mm, more preferably greater than 75 mm, and most preferably greater than 85 mm.

The cutting edge of the blade may extend across the entire length of the blade, or may alternatively extend across only a portion of the length of the blade.

In embodiments wherein the cutting edge extends across only a portion of the length of the blade, the blade may comprise two end portions at which the bevelled portion of the upper or lower surface (as appropriate) does not extend to meet the opposing surface to form a cutting edge. Accordingly, the cutting edge may be formed only across a central portion of the length of the blade.

Each of the end portions of the blade may comprise a front surface extending between the upper surface and the lower surface. The width of each end portion of the blade between the front surface and the back surface is preferably greater than 30 mm, more preferably greater than 40 mm, and most preferably greater than 50 mm.

When at least a portion of the upper surface is substantially parallel to at least a portion of the lower surface, the width of the parallel portion of the upper and/or lower surface, being a surface which also comprises a bevelled portion, is preferably at least a quarter of the total width of the blade from the cutting edge to the back surface. The width of the parallel portion of the upper surface and/or lower surface is more preferably approximately half the total width of the blade from the cutting edge to the back surface.

The angle between the upper surface and the lower surface at the cutting edge is preferably between 5° and 45°, more preferably between 15° and 35°, and most preferably between 20° and 30°.

Each clamping unit is adapted to secure an end of the blade unit to a side wall of the frame. When both ends of the blade unit are clamped within respective clamping units attached to a side wall of the frame, the blade unit is secured in a transverse direction of the apparatus such that the blade unit bridges a space between the two opposing side walls.

According to the present invention, the clamping unit has a dimension in the transverse direction that is greater than a dimension of the side wall of the frame in the transverse direction. In preferred embodiments, the dimension of the clamping unit in the transverse direction is at least twice that of the side wall of the frame. Advantageously, this provides structural stability to the blade unit when clamped within the clamping units, substantially eliminating vibrations in the blade during the sectioning operation and therefore reducing the number of defects formed in the section of tissue specimen produced.

The dimension of the side wall in the transverse direction is preferably in the range of 16 mm to 25 mm. In a preferred embodiment, the dimension of the side wall in the transverse direction is at least 20 mm. The dimension of the clamping unit in the transverse direction is preferably in the range of 40 to 70 mm. More preferably, the dimension of the clamping unit in the transverse direction is in the range of 50 mm to 60 mm.

In one embodiment of the present invention, the drive mechanism is adapted to advance the specimen stage towards the blade unit in substantially horizontal and vertical directions. In such embodiments, each clamping unit, and hence also the blade unit, is fixed against movement. Accordingly, a specimen mounted on the specimen stage may be advanced vertically in the general direction of the blade unit until an uppermost surface of the tissue specimen and the cutting edge of the blade overlap in a vertical direction, at least to some extent. Subsequent advancement of the specimen stage in the horizontal direction will cause the tissue specimen to come into contact with the blade, and a section of the tissue will be cut as the specimen stage continues to advance in the horizontal direction and the tissue specimen is moved across the cutting edge of the blade.

The drive mechanism may comprise a vertical drive mechanism and a horizontal drive mechanism.

The vertical height of the tissue specimen may be adjusted by the vertical drive mechanism by an amount corresponding to the desired section thickness. For example, in order to obtain a section of 25 µm, the vertical drive mechanism is configured to advance the specimen stage in a substantially vertical direction by a distance of 25 µm. Subsequent advancement of the specimen stage in the horizontal direction by the horizontal drive mechanism towards the cutting edge of the blade yields a section of the desired thickness.

Preferably, the drive mechanism is arranged to advance the specimen stage in the vertical direction in increments of 1 The drive mechanism may also be arranged to advance the specimen stage in the horizontal direction at a speed in the range 2 to 50 millimetres per second.

Each side wall of the frame extends in a longitudinal direction of the apparatus and has a longitudinally-extending edge which, in use, is at an upper part of the apparatus. Preferably, a cutaway portion is formed along the upper edge of each side wall of the frame to accommodate at least part of the clamping unit and the clamping unit is mounted on the cutaway portion. By mounting each clamping unit on a cutaway portion of a respective side wall, the clamping unit is secured to the frame. This arrangement allows the entire frame structure, including the side walls and the clamping units, to take the inertia of the tissue specimen as it comes into contact with the blade and thus prevents movement and/or backlash of the blade during the sectioning operation. Forces exerted upon the clamping unit via the blade during the sectioning procedure are dispersed throughout the side walls of the frame, via the clamping units, thus acting to reduce or substantially eliminate vibrations of the blade and minimising defects formed in the resulting sections of tissue specimen.

To maximise this effect, the clamping unit is preferably supported by the side wall along the entire length of a base portion of the clamping unit and along at least part of a rear-facing portion of the clamping unit. Preferably, the side wall supports the clamping unit along at least half of the height of the rear-facing portion, such that the upper edge of the side wall directly adjacent the cutaway portion extends above the mid-point of the rear-facing portion of the clamping unit. The rear-facing portion is substantially vertical in some embodiments, with its height extending in the vertical direction. A rear end of the apparatus is defined as an end of the apparatus towards which the specimen is advanced in order for a section to be cut. A rear-facing portion of the clamping unit is therefore a portion of the clamping unit which, in use, generally faces the rear end of the apparatus.

In preferred embodiments, the angle of the blade relative to a horizontal plane is variable. Accordingly, by varying the angle between the tissue specimen and the cutting edge of the blade, the pressure exerted on the tissue specimen during sectioning can be controlled. Preferably, the angle of the blade relative to the horizontal plane is variable between 0 to 30°. The angle of the blade may be continuously or discontinuously variable.

To achieve this, the angle at which the blade unit is clamped by the clamping units may be adjustable. The blade unit may be rotatably mounted within the clamping units, and the angle at which the blade unit is clamped may be adjusted by rotation of the blade unit within the clamping units. The clamping units may comprise means for adjusting the angle at which the blade unit is clamped and/or the clamping units may comprise means for rotating the blade unit within the clamping units. For example, the clamping units may comprise a rotatable portion in which the blade unit is clamped.

Alternatively, or additionally, the angle at which the clamping units are fixed to the side walls may be variable. The clamping units may be rotatably fixed to the side walls, such that rotation of the clamping units adjusts the angle of the blade, when the blade unit is clamped within the clamping units.

Each clamping unit may comprise first and second portions which are adapted to clamp one end of the blade unit between them. This provides a secure clamping arrangement of the blade unit within the clamping units, helping to reduce vibrations. Each clamping unit may further comprise two side faces lying in a plane substantially parallel to the plane of the side wall, and at least one edge face extending between the two side faces The profile of the cutaway portion is preferably shaped to accommodate a correspondingly-shaped part of the clamping unit. As a result, the side wall of the frame abuts and supports at least part of the clamping unit at the cutaway portion. The profile of the cutaway portion may have any appropriate shape to correspond to the profile of the edge face(s) of the clamping unit which the side wall is arranged to abut and support.

In preferred embodiments, the upper edge of the side wall may have a substantially L-shaped or U-shaped profile at the cutaway portion of the side wall when the side wall is viewed in the transverse direction: the cutaway portion of the side wall therefore has either a substantially L-shaped or U-shaped profile. Alternatively, the cutaway portion is an aperture in the side wall, this aperture being shaped to surround and accommodate the clamping unit.

In one embodiment, at the cutaway portion, the upper edge of the side wall comprises at least one substantially vertically-extending portion and at least one substantially horizontally-extending portion which are arranged to abut and support one or more edge faces of the clamping unit. The substantially vertically-extending portion may be substantially at right angles to the horizontally-extending portion of the upper edge of the side wall, although this is not limiting and other angles are envisaged. In another embodiment, at the cutaway portion, the upper edge of the side wall has a substantially curved profile.

The clamping unit may have at least six faces, with at least two opposing side faces lying in planes which are substantially parallel to the side wall of the frame and at least four edge faces lying in planes which are generally perpendicular to the plane of the side faces, and which extend between the two opposing side faces. In such embodiments the clamping unit may have a substantially rectangular cuboid shape. In these embodiments, the clamping unit may have dimensions in the longitudinal and vertical directions which are substantially equal, and a dimension in the transverse direction which is smaller than the dimensions in the longitudinal and vertical directions. Alternatively, the dimensions of the clamping unit in the longitudinal and vertical directions may not be substantially equal. In addition or alternatively, the dimension in the transverse direction may be larger than the dimensions in the longitudinal and vertical directions.

In use, the (at least) four edge faces of the clamping unit may comprise opposing upper and lower edge faces lying in planes substantially parallel to the upper edge of the side wall, and opposing front and rear edge faces lying in planes substantially perpendicular to the planes of the opposing side faces and the planes of the opposing upper and lower edge faces. Preferably, the clamping unit is mounted on or fixed to the side wall by supporting at least the lower edge face of the clamping unit on the upper edge of the side wall at the cutaway portion.

The side wall of the frame may be arranged to abut the rear edge face of the clamping unit, preferably along at least a quarter, and more preferably along at least half, of the vertical height of said rear edge face. In one embodiment, the cutaway portion of the side wall has a substantially vertically-extending portion which is arranged to abut and support the rear edge face of the clamping unit along at least a quarter, and preferably along at least half, of the vertical height of the rear edge face. In further embodiments, such as those having a substantially U-shaped cutaway portion, the side wall may be arranged to abut and support both the front and the rear edge faces, as well as the lower edge face, of the clamping unit. In yet further embodiments, the side wall may be arranged to abut all the edge faces of the clamping unit. That is to say, the cutaway portion may be an aperture formed in the side wall of the frame and the clamping unit may be arranged to be positioned within the cutaway portion such that all its edge faces are abutted by an edge of the side wall in the cutaway portion.

Other embodiments of the clamping unit may have any other appropriate shape. For example, the clamping unit may be cylindrical, having two opposing side faces lying in planes which are substantially parallel to the side wall of the frame and one continuous edge face extending between the two opposing side faces. In such embodiments, the cutaway portion may have a substantially curved or a substantially semi-circular profile, so as to abut the edge face of the cylindrical clamping unit and to support the clamping unit.

Various embodiments of the side wall have been described in relation to the profile of the upper edge of the side wall at the cutaway portion when viewed in a transverse direction. It will be appreciated that numerous conceivable configurations of the upper edge of the side wall could be adopted for the sectioning apparatus of the present invention. In some embodiments, in use, the level of the upper edge of the side wall along the length of the sidewall in the longitudinal direction is substantially constant apart from the cutaway portion. In other words, the level of the upper edge of the side wall is substantially the same to either side of the cutaway portion. This would be the case where the cutaway portion has a substantially U-shaped profile, for example.

In other embodiments, the level of the upper edge of the side wall is not constant along the length of the side wall i.e. the upper edge of the side wall has at least one change in level along its length. The upper edge of the sidewall may comprise at least two horizontally-extending portions, and the respective levels of these two horizontally-extending portions are different. Each cutaway portion may, for example, be configured in the form of a step. In the case of a cutaway portion having a substantially L-shaped profile, the level of the upper edge of the side wall to one side of the cutaway portion in the longitudinal direction is lower than the level of the upper edge of the side wall to the other side of the cutaway portion in the longitudinal direction. In one embodiment, in use, the level of the upper edge of the side wall to a side of the cutaway portion towards the rear of the apparatus is higher than the level of the upper edge of the side wall to a side of the cutaway portion towards the front of the apparatus. In another embodiment, in use, the level of the upper edge of the side wall to a side of the cutaway portion towards the front of the apparatus is higher than the level of the upper edge of the side wall to a side of the cutaway portion towards the rear of the apparatus. It will be appreciated that further embodiments of the present invention may comprise side walls having any number of changes in level along the length of the upper edge thereof. The term 'level' in the context of the present invention refers to a height from the ground.

Preferably, the length of a portion of the side wall which, in use, extends from the cutaway portion towards the rear of the apparatus is at least the same length as a dimension of the clamping unit in the longitudinal direction. More preferably, the length of said portion of the side wall is at least twice the length of said dimension of the clamping unit in the longitudinal direction. Most preferably, the length of said portion of the side wall is at least four times the length of said dimension of the clamping unit in the longitudinal direction.

In preferred embodiments of the sectioning apparatus according to the present invention, each clamping unit comprises an outer body and an inner body accommodated within the outer body, the inner body being adapted to retain an end of the blade unit. The inner body provides a means for clamping the blade unit within the clamping unit and may also be configured to allow the blade unit to be clamped at a variable cutting angle relative to a horizontal plane of the apparatus. The outer body may be formed integrally with the side wall or alternatively may be adapted to be securely mounted on or fixed to the side wall.

The inner body may comprise a pair of half portions, which are combinable to form the inner body. Each half portion is provided with a substantially flat contacting face, arranged to abut the corresponding contacting face of the other half portion. Accordingly, an end of the blade unit may be sandwiched between the corresponding contacting faces of the pair of half portions, so as to retain the blade unit within the inner body of the clamping unit. To facilitate clamping of the blade unit between the corresponding half portions, each contacting face may be provided with a recess which is shaped and configured to receive an end of the blade unit. When the two contacting faces of the pair of half portions are combined, the pair of recesses formed within the contacting faces define an aperture which is shaped and configured to receive an end of the blade unit. In embodiments where the blade unit comprises a retaining member at an end thereof, the aperture defined by the corresponding pair of recesses formed in the pair of half portions is shaped and sized to surround and contact the retaining member. In alternative embodiments, where the blade unit does not comprise a retaining member, the aperture is shaped and sized to surround and contact end portions of the blade. The blade may be directly retained within the inner body of the clamping unit. Preferably, at least a portion of each of the upper surface, lower surface, front surface and back surface of the end portion of the blade are abutted by the inner body when the blade is directly retained within the inner body of the clamping unit.

Preferably, the outer body comprises a cavity arranged to accommodate the inner body. Accordingly, the inner body may be positioned within the cavity of the outer body, and the outer body is formed integrally with or is fixed to the side wall of the frame, such that the entire clamping unit is joined to the frame and provides a means for clamping and securing the blade unit within the frame assembly.

The outer body and the inner body of the clamping unit may each comprise two opposing side surfaces lying in planes which, in use, are substantially parallel to the sidewall of the frame. Each of the outer body and the inner body may further comprise one or more peripheral surfaces extending between the two opposing side surfaces. The inner body preferably extends between the opposing side surfaces of the outer body.

In preferred embodiments of the present invention, the two side surfaces of the inner body do not extend beyond the respective opposing side surfaces of the outer body in the transverse direction of the apparatus: each side surface of the inner body may be substantially flush with the corresponding side surface of the outer body, or alternatively each side surface of the inner body may be recessed from the corresponding side surface of the outer body. Thus, in such embodiments, the inner body is wholly contained within the cavity. Accordingly, the forces exerted upon the blade unit during the sectioning operation can be readily dispersed through the inner body of the clamping unit to the outer body, and subsequently to the side walls of the frame. Thus, vibrations of the blade unit may be substantially eliminated and the number of defects formed in the sectioned tissue specimen can be reduced.

It will be appreciated that, in these embodiments, in order for the blade unit to be clamped within the inner body, the outer body is provided with an opening for exposing the inner body, at least in part, when the clamping unit is viewed in the transverse direction. The opening is formed in at least one of the opposing side surfaces of the outer body, i.e. in at least an inwardly-facing side surface of the outer body, although openings may be formed in both of the two opposing side surfaces of the outer body. Accordingly, at least one, and preferably both, of the opposing side surfaces of the inner body may be exposed, at least in part.

In some embodiments of the present invention, the side surface of the outer body may comprise a lip extending around the periphery of the opening formed in its side surface, the lip being arranged to overlap the corresponding side surface of the inner body, at least in part. Preferably, each opening of the outer body of the clamping unit comprises a lip as described. The lip formed in the opening assists in retaining the inner body within the outer body, thus providing a secure and stable clamping unit structure. The lip may be substantially flush with the side surface of the outer body on which it is provided, or the lip may protrude outwardly from the plane of the side surface. Preferably, the dimension of the inner body in a transverse direction is such that the two opposing side surfaces of the inner body each abut a lip of the opening formed in the corresponding side surface of the outer body.

In embodiments of the present invention where the clamping unit comprises an inner body and an outer body, the shape of the outer body may define the general shape of the clamping unit as a whole, since the inner body is preferably wholly contained within the outer body. Thus, in preferred embodiments, the outer body preferably has at least six faces, with at least two opposing side faces lying in planes which are substantially parallel to the side wall of the frame and at least four edge faces lying in planes which are generally perpendicular to the plane of the side faces, and which extend between the two side faces. In such embodiments, the edge faces correspond to the peripheral surfaces of the outer body. The outer body may have a substantially rectangular cuboid shape. In these embodiments, the outer body may have dimensions in the longitudinal and vertical directions which are substantially equal, and a dimension in the transverse direction which is smaller than the dimensions in the longitudinal and vertical directions. Alternatively, the dimensions of the outer body in the longitudinal and vertical directions may not be substantially equal. In addition, or alternatively, the dimension in the transverse direction may be larger than the dimensions in the longitudinal and vertical directions The side wall of the frame may be configured to abut and support the outer body as discussed above in relation to the clamping unit as a whole.

The inner body may have a generally cylindrical shape, having two opposing side surfaces displaced in the transverse direction and having one peripheral surface extending between them, the peripheral surface being generally circular in profile. In embodiments where the inner body comprises a pair of half portions, the generally cylindrical shape of the inner body may be formed by combination of the pair of half portions by abutment of the two contacting faces. Accordingly, each half portion may have a generally semi-cylindrical shape.

The inner body is preferably rotatable within the outer body. Accordingly, when the blade unit is retained by the inner body, the angle of the blade, relative to a horizontal plane, may be adjusted by rotation of the inner body within the outer body. Preferably, the blade unit only rotates in combination with the inner body. The inner body may advantageously be provided with a handle fixed to one side surface thereof for facilitating rotation of the inner body within the outer body. The handle may protrude through the opening formed in the corresponding side surface of the outer body, to allow a user to easily adjust the rotation of the inner body.

The clamping unit preferably comprises means for securing the inner body within the outer body in a fixed position and orientation, such that movement or rotation of the inner body within the outer body is not possible during use of the apparatus. Accordingly, the inner body can be arranged into the desired position and/or orientation, for example the inner body may be rotated to place the blade at a desired cutting angle, and subsequently the means for securing the inner body within the outer body can be operated so as to prevent further movement of the inner body. Accordingly, the inner body, and thus the blade unit, is retained in a fixed position and/or orientation during the sectioning procedure.

In some embodiments, the outer body may comprise a tightening means for tightening the outer body around the inner body such that the inner body is secured in a fixed position and/or orientation. The tightening means may comprise a screw mechanism associated with the outer body. The outer body may comprise a slit extending from its peripheral surface(s) to its cavity. The slit may divide the front portion and/or the rear portion of the outer body into two portions. The slit may lie in a substantially horizontal plane of the apparatus and may be formed approximately at a mid-point of the clamping unit in a vertical direction. The slit may be formed approximately at a mid-point between the upper edge face and the lower edge face of the clamping unit.

The screw mechanism may be arranged to extend through a peripheral surface of the outer body into the outer body. The screw mechanism may have a substantially vertical axis, which is centred approximately at a mid-point between the two opposing side surfaces of the outer body. The substantially vertical axis may be substantially parallel to the two opposing side surfaces of the outer body. In certain embodiments, the substantially vertical axis may also be substantially parallel to the front and rear edge faces of the clamping unit and may be substantially perpendicular to the upper and lower edges faces of the clamping unit. The screw mechanism may be arranged to extend through the slit, such that tightening of the screw forces together the two portions of the outer body, that are located on either side of the slit, so as to tighten the outer body and to secure the inner body in a fixed position and/or orientation.

The clamping unit may comprise alternative means for securing the inner body in a fixed position and/or orientation, such as one or more screws or bolts arranged to extend from the outer body into the inner body.

In order additionally to brace the clamping unit to the side wall of the frame during use of the apparatus, whether the clamping unit is formed integrally with or fixed to the side wall, the clamping unit may comprise at least one flange arranged to extend beyond the upper edge of the side wall and lie adjacent the side wall. The flange may be arranged to lie adjacent a side surface of the side wall. Preferably, the clamping unit comprises at least one flange arranged to lie adjacent an inwardly-facing side surface of the side wall (i.e. inwardly-facing in the transverse direction of the apparatus). The upper edge of the sidewall directly adjacent the clamping unit may be at approximately the same level as the uppermost portion of the flange.

In certain embodiments, the flange may extend along the entire length of the lower edge face of the clamping unit. The same or a different flange (or flanges) may extend along the front and/or rear edge face of the clamping unit in a vertical direction. In this respect, said flange may extend to an approximate mid-point of the relevant front and/or rear edge face of the clamping unit. In addition or instead, the flange or flanges may extend along the front and/or rear edge face of the clamping unit in a vertical direction to approximately the same level as an adjacent portion of the upper edge of the side wall: the upper edge of the sidewall directly adjacent the substantially vertically-extending portion of the clamping unit is then at approximately the same level as the uppermost portion of the flange.

The clamping unit may comprise two or more flanges arranged to lie adjacent opposing side surfaces of the side wall, such that a portion of the side wall is sandwiched between two flanges. A plurality of fastening means may be provided, which, in use, are arranged to extend through the flange(s) into the side wall so as to secure the clamping unit to the side wall. The fastening means may be bolts or screws.

A flange or flanges may be provided adjacent any portion of the edge face(s) of the clamping unit that are abutted and supported by the upper edge of the side wall. Thus, in any position at which the upper edge abuts and supports an edge face or edge faces of the clamping unit, one or more flanges may also be provided to brace the clamping unit against a side surface of the side wall: the flange(s) may lie adjacent the inwardly-facing and/or the outwardly-facing side surfaces of the side wall. The flange(s) assist in the dispersion of forces experienced by the blade unit during the sectioning operation throughout the whole frame structure, via the clamping unit.

In embodiments where the clamping unit comprises a slit, an opposing flange may be provided to counteract the weakness created in the structure of the clamping unit by the slit. Thus, for example, when the slit is provided in the front portion of the clamping unit, a flange is provided on the rear portion of the clamping unit, and vice versa.

In preferred embodiments of the sectioning apparatus, the frame may further comprise a front wall extending between the two side walls at a front end thereof in the longitudinal direction, and a rear wall extending between the two side walls at a rear end thereof in the longitudinal direction. Each of the front, rear and two opposing side walls of the frame may be substantially solid, that is to say, the walls of the frame are each provided as solid walls with no apertures formed therein. Alternatively, apertures may be formed in one or more of the walls of the frame so as to provide access to internal components of the sectioning apparatus, to insert a clamping unit, or alternatively or additionally to reduce the weight of the wall. For example, at least one of the side walls of the frame may comprise an aperture for providing access to one or more components of the drive mechanism. Similarly, at least one of the front or rear walls may have a plurality of apertures formed therein, providing a reduction in the overall weight of the wall, whilst still providing substantial structural stability. In some embodiments, apertures may be formed in the front and rear walls such that the wall has a cross-braced structure. It will be appreciated that the two opposed side walls may also be provided with a cross-braced structure, at least in part.

The walls of the frame and the clamping unit are preferably precision engineered and may be made of steel or aluminium, for example. Any other appropriate material may alternatively be employed.

In preferred embodiments, the drive mechanism comprises a low torque stepper motor for providing relative movement between the specimen stage and the blade unit, preferably in combination with a worm screw. This may be in vertical and longitudinal directions, and separate horizontal and vertical drive mechanisms may be used. In one embodiment, the drive mechanism comprises at least one low torque stepper motor arranged to advance the specimen stage towards the blade unit. More preferably, the drive mechanism comprises at least one ultra-low torque stepper motor. The use of a low torque or an ultra-low torque stepper motor allows the relative movement of the specimen stage and the blade unit to be controlled to a high degree of precision and further allows the drive mechanism to operate under extreme pressure. Accordingly, the stage can be moved in very small increments of distance. For example, it may be required to advance the specimen stage in increments as small as 1 µm in order to obtain sections of tissue of an equivalent thickness. Preferably, the apparatus is arranged to provide advancement of the specimen stage in increments of 25 µm or less. More preferably, the apparatus is arranged to provide advancement of the specimen stage in minimum increments of 5 µm.

The sectioning apparatus may further comprise a receiving surface for receiving a section of tissue cut from the tissue specimen. In preferred embodiments, the receiving surface comprises a glass slide, and the apparatus further comprises a means for mounting the glass slide or other receiving surface. The means for mounting a glass slide or other receiving surface may comprise a pair of brackets, each bracket being fixed to one of the clamping units or one of the two opposing side walls of the frame in a position rearwards of the blade unit in the longitudinal direction. The brackets may be arranged to hold a receiving surface directly, or alternatively may provide a support for mounting a platform, on which a receiving surface may subsequently be placed.

Preferably, the sectioning apparatus is arranged to operate within a refrigerated cabinet cooled to temperatures as low as −60° C.

Non-limiting embodiments of the invention will now be described, by way of example only, with reference to the accompanying drawings in which:

FIG. 8b is a top plan view of the blade unit of FIG. 8a;

Referring to the Figures, there is shown a sectioning apparatus according to an embodiment of the present invention.

Figure 1:
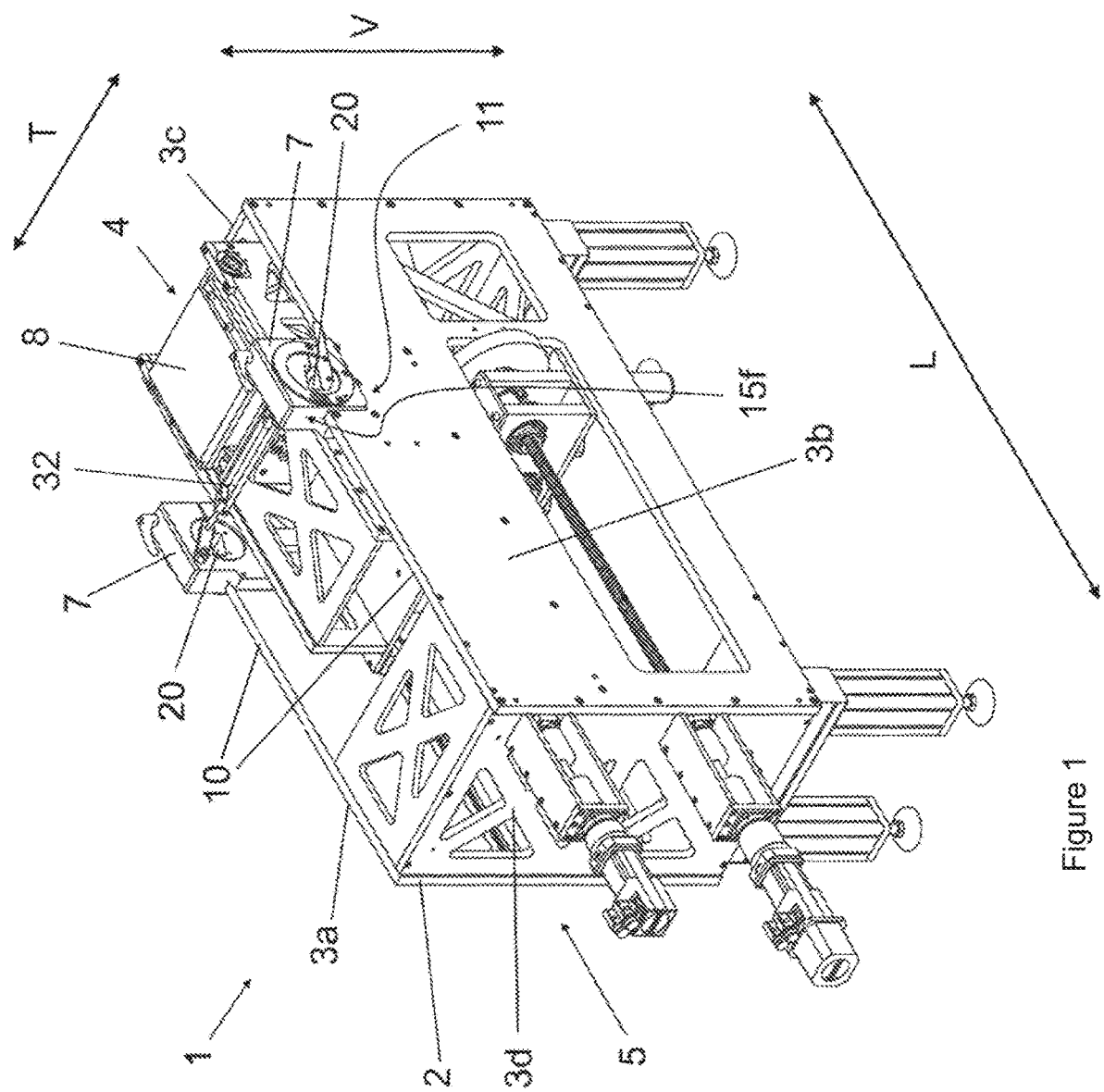
FIG. 1 is a perspective view of a sectioning apparatus according to one embodiment of the present invention.
Figure 2:
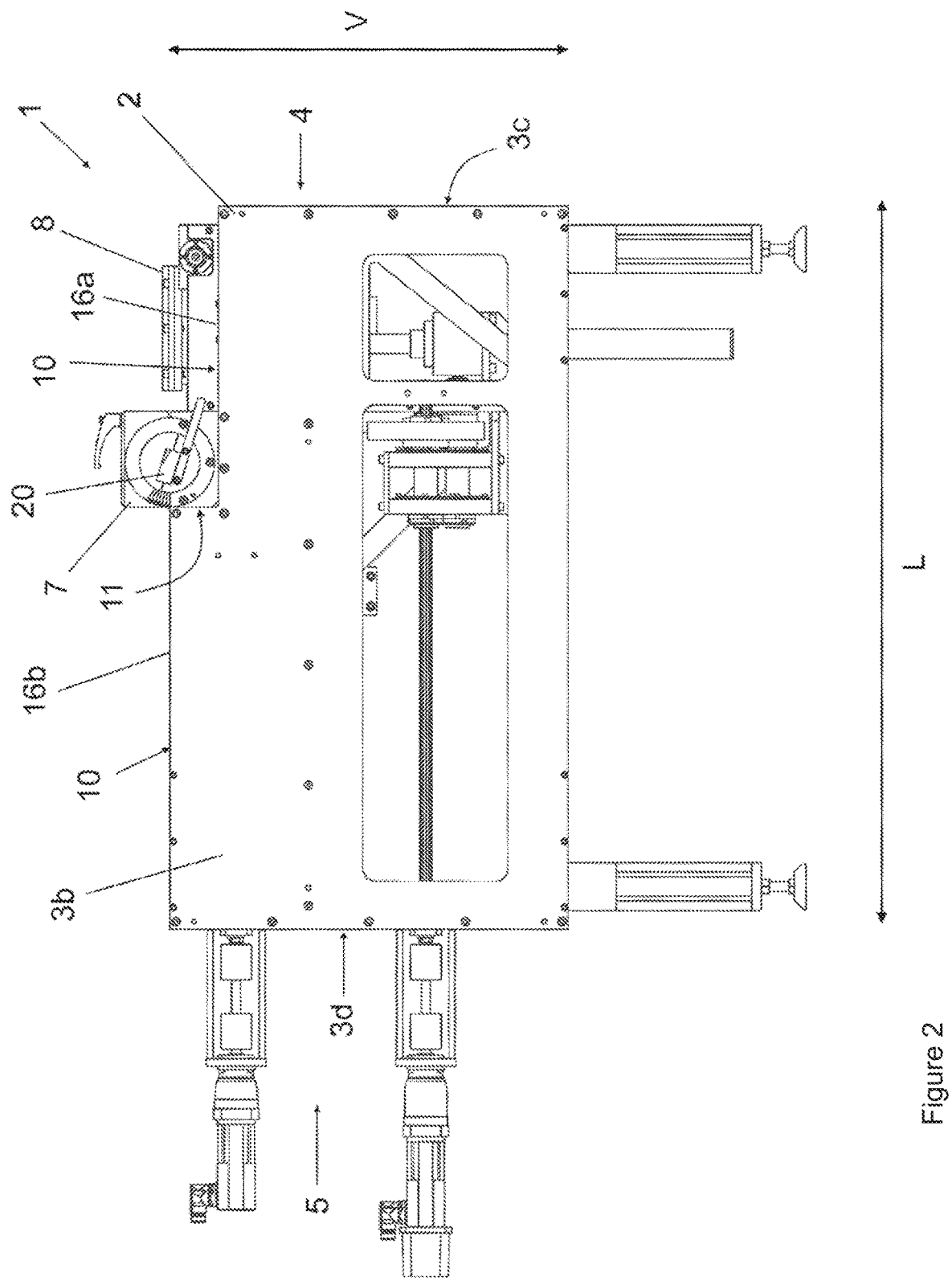
FIG. 2 is a side elevation of the sectioning apparatus of FIG. 1.
Figure 3:
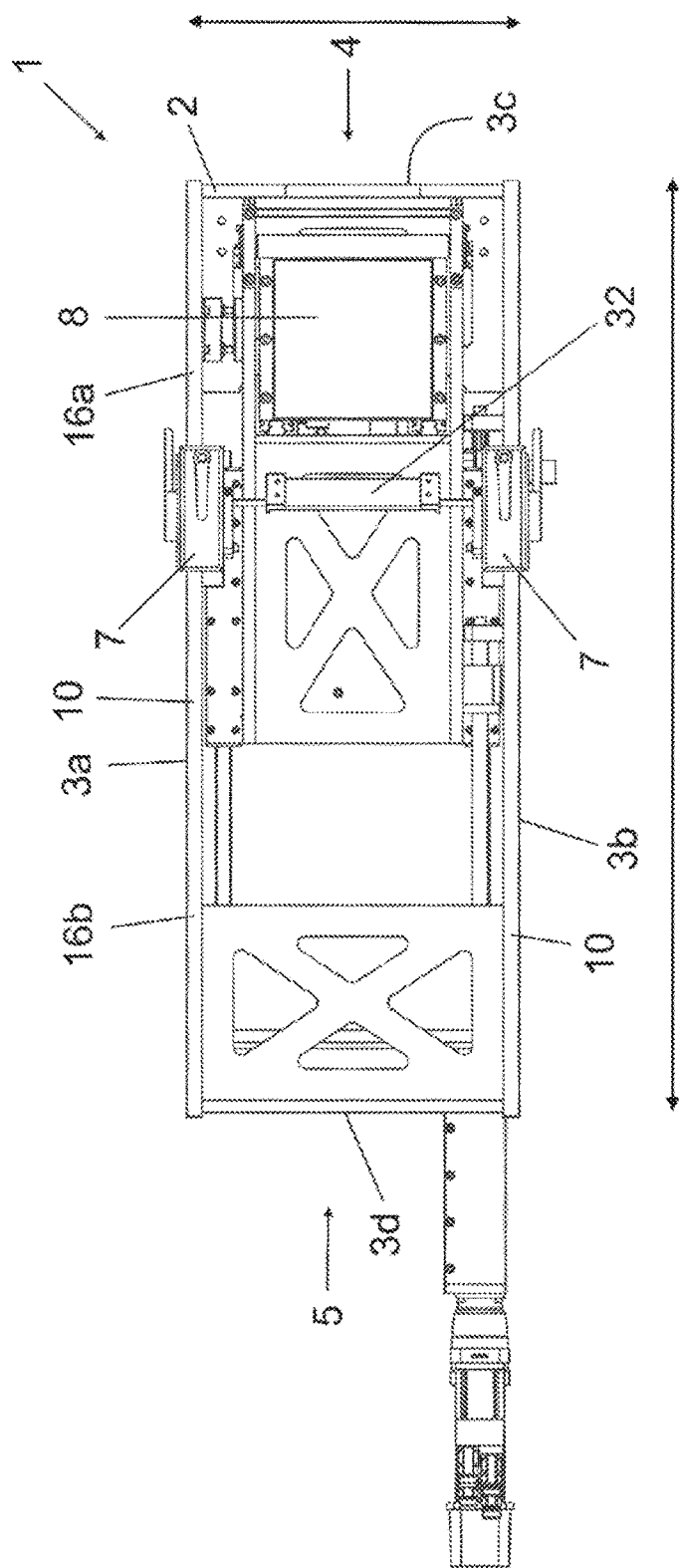
FIG. 3 is a plan view of the sectioning apparatus of FIG. 1.

FIGS. 1 to 3 show a sectioning apparatus 1 having a longitudinal direction L, a transverse direction T and a vertical direction V. The sectioning apparatus 1 comprises a frame 2 having two opposing side walls 3a, 3b extending in the longitudinal direction, a front end wall 3c extending in the transverse direction T between the two opposing side walls 3a, 3b at a front end 4 of the apparatus 1, and a rear end wall 3d extending in the transverse direction T between the two opposing side walls 3a, 3b at a rear end 5 of the apparatus 1. The apparatus 1 further comprises a clamping unit 7 fixed to each side wall 3a, 3b of the frame 2, each clamping unit 7 being adapted to retain one end of a blade unit 6 (not shown), such that the blade unit 6 is mounted between the side walls 3a, 3b of the frame 2 in the transverse direction T. For this purpose, each clamping unit 7 comprises an aperture 20 shaped and configured to retain an end of the blade unit 6. Other embodiments of the present invention may comprise a clamping unit which is formed integrally with the side walls 3a, 3b of the frame 2.

The sectioning apparatus 1 further comprises a specimen stage 8. The specimen stage 8 comprises a substantially flat upper surface arranged to receive a tissue specimen (not shown). In particular, the specimen stage 8 is sized to receive a large tissue specimen such as a human brain.

The apparatus 1 has a drive mechanism, which is arranged to advance the specimen stage 8 in the longitudinal direction L and in the vertical direction V of the apparatus 1. Horizontal movement of the specimen stage 8 in the longitudinal direction L and vertical movement in the vertical direction V allows a tissue specimen mounted on the specimen stage 8 to be brought into contact with a cutting edge of the blade 9 in order to produce a section of the tissue specimen of a desired thickness (as described in greater detail below). A blade cover 32 is mounted between the two clamping units 7, arranged to cover an upper surface of the blade 9. Blade cover 32 prevents rolling of the section of tissue specimen as it is being cut by the blade 9.

As shown in FIGS. 1 and 2, each side wall 3a, 3b of the frame 2 has a longitudinally-extending edge 10, which is at an upper part of the apparatus 1 and which extends along the length of the side wall 3a, 3b of the frame 2 in a longitudinal direction L. In the illustrated embodiment, each clamping unit 7 is fixed to the upper edge 10 of a respective side wall 3a, 3b.

Figure 4:
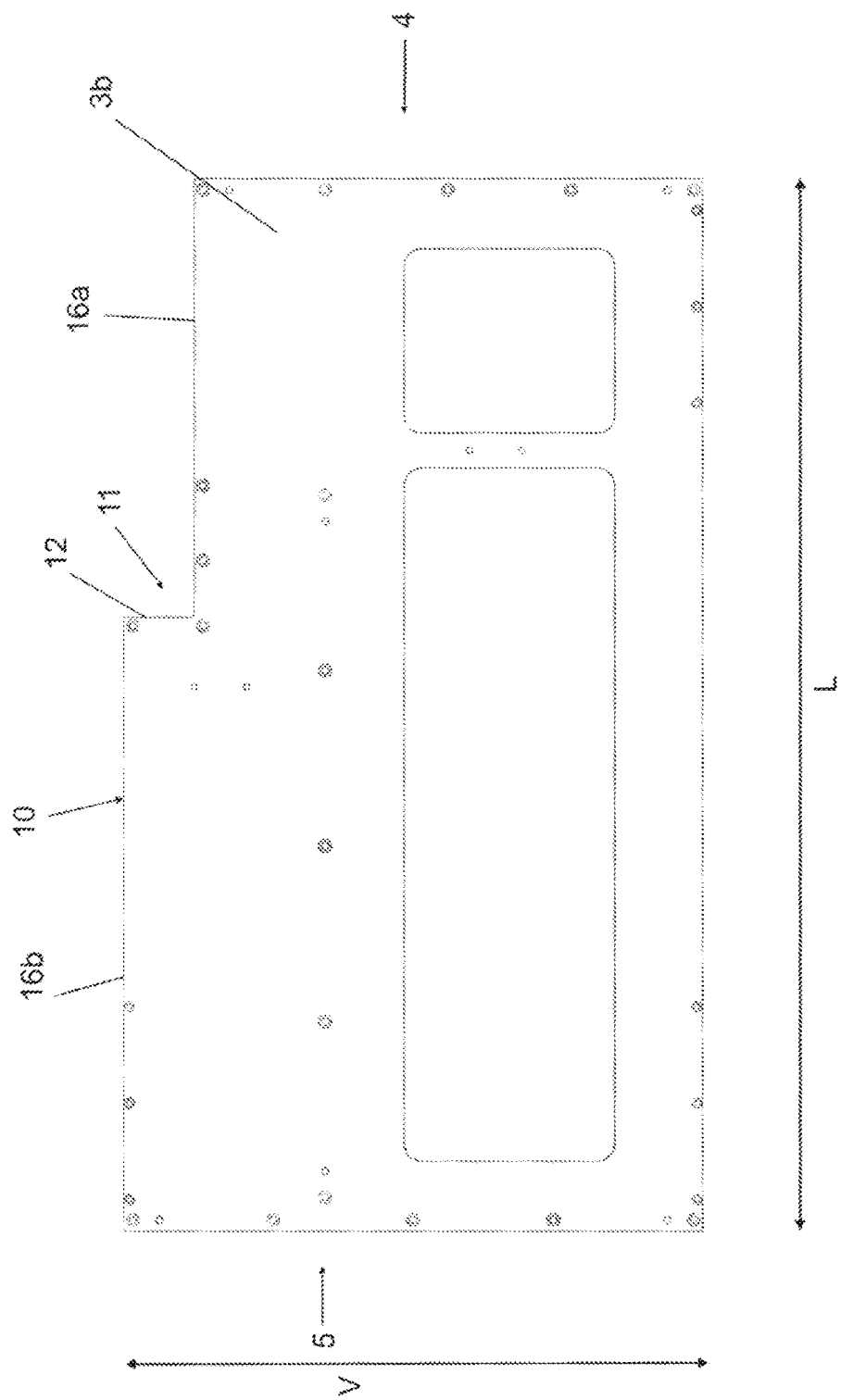
FIG. 4 is a perspective view of the side wall of the sectioning apparatus in isolation.

As shown in FIGS. 2 and 4, a cutaway portion 11 is formed in the upper edge 10 of the side wall 3b to facilitate attachment of the clamping unit 7 to the side wall 3b. The cutaway portion 11 is shaped to accommodate at least part of clamping unit 7, such that when the clamping unit 7 is mounted within the cutaway portion 11, the side wall 3b abuts and supports a part of the clamping unit 7.

The cutaway portion of the present invention may have a different shape in different embodiments, however the cutaway portion will be generally shaped to correspond with the shape of the clamping unit 7. Thus, in the embodiment shown (where the clamping unit 7 has a generally rectangular cuboid shape) the cutaway portion 11 of the side wall 3b has an L-shaped profile when viewed in the transverse direction. As shown most clearly in FIG. 4, the cutaway portion 11 formed in the upper edge 10 of the side wall 3b has a substantially vertically-extending portion 12 and a substantially horizontally-extending portion which abut a peripheral surface of the clamping unit 7 and thus provide support to the clamping unit 7.

As discussed, the clamping unit 7 of the illustrated embodiment has a substantially rectangular cuboid shape. This is shown more clearly in FIG. 5, which shows an outwardly-facing side face of the clamping unit 7. The clamping unit 7 has an outer body 13 and an inner body 14 housed within the outer body 13. The general shape of the clamping unit 7 is therefore defined by the outer body 13. In the illustrated embodiment, the outer body 13 has two opposing side surfaces 15a, 15b and four edge faces 15c, 15d, 15e, 15f extending between the two opposing side surfaces 15a, 15b. The four edge faces consist of opposing upper and lower edge faces 15c, 15d lying in a plane substantially parallel to the horizontally-extending upper edge 10 of the side wall 3b, and opposing front and rear edge faces 15e, 15f lying in planes which are substantially perpendicular to the planes of the opposing side faces 15a, 15b and the planes of the opposing upper and lower edge faces 15c, 15d.

Referring to FIG. 2, the substantially vertically-extending portion 12 of the upper edge 10 of the side wall 3b in the cutaway portion 11 is arranged to abut the rear edge face 15f of the outer body 13 of the clamping unit 7. Also, the substantially horizontally-extending portion of the upper edge 10 of the side wall 3b in the cutaway portion 11 is arranged to abut the lower edge face 15d of the outer body 13 of the clamping unit 7.

It will be appreciated that in other embodiments of the present invention, other edge faces of the outer body of the clamping unit may be abutted and supported by the upper edge of the side wall of the frame, either alternatively or additionally.

For example, the cutaway portion may have a substantially U-shaped profile as viewed in a transverse direction and thus may comprise two substantially vertically-extending portions. In such embodiments both the front and rear edge faces of the clamping unit may be abutted by and supported by the two substantially vertically-extending portions of the upper edge of the side wall in the cutaway portion. Also, the lower edge face of the clamping unit may be abutted by and supported by the substantially horizontally-extending portion of the upper edge of the side wall in the cutaway portion.

In the embodiment of FIGS. 2 and 4, the level of the upper edge 10 of the side wall 3b changes along the length of the side wall 3b. A first horizontally-extending portion 16a of the upper edge 10 of the side wall 3b which is towards the front end 4 of the apparatus 1 is lower than a second horizontally-extending portion 16b of the wall which is towards the rear end 5 of the apparatus 1, and the substantially vertically-extending portion 12 extends between the first and second horizontally-extending portions 16a, 16b. Accordingly, the side wall 3b has a generally stepped configuration, which is suitable for accommodating the clamping unit 7. The substantially vertically-extending portion 12 of the upper edge 10 in the cutaway portion 11 is arranged to abut the rear edge face 15f of the outer body 13 of the clamping unit 7 along approximately half of the vertical height of the rear edge face 15f.

Figure 7A:
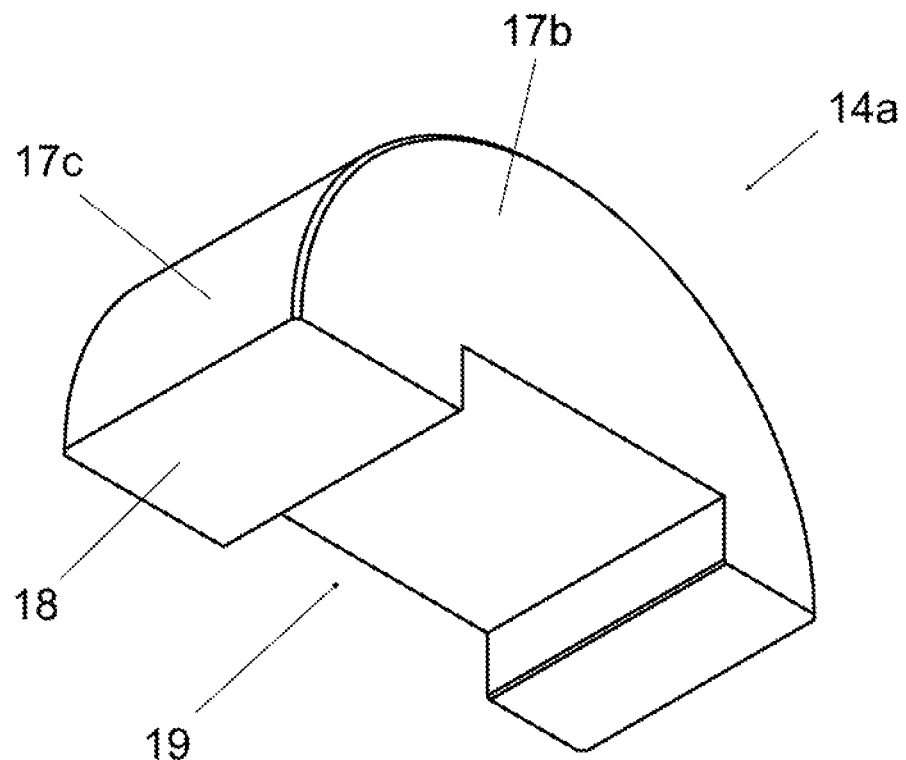
FIGS. 7a and 7b are perspective views of respective half portions of the inner body of the clamping unit according to one embodiment of the present invention.
Figure 7B:
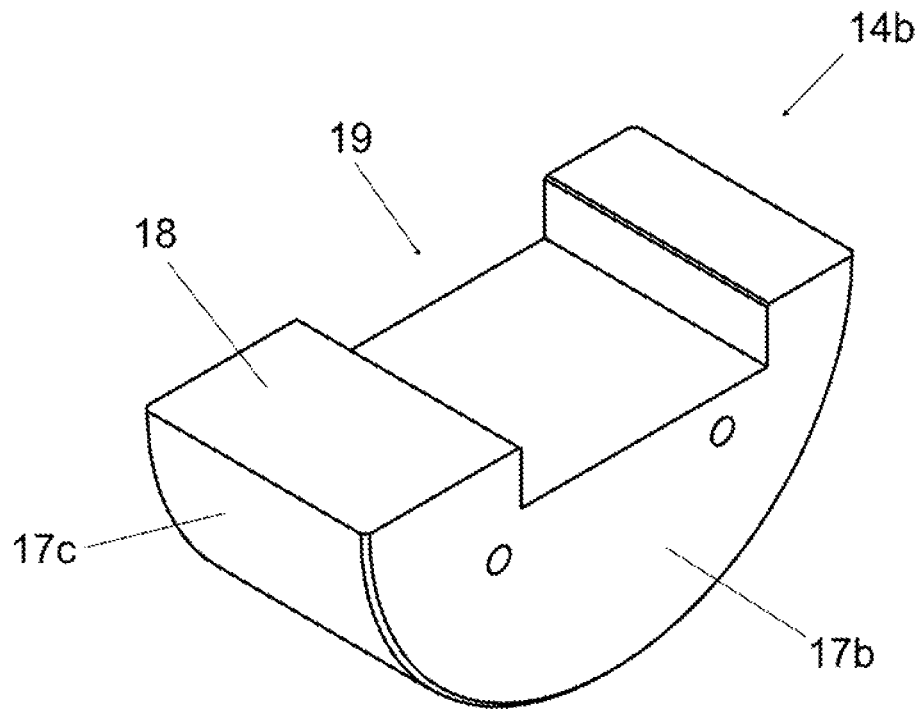

In the embodiment of FIGS. 7a and 7b, the inner body 14 of the clamping unit 7 has a generally cylindrical shape, having two opposing side surfaces 17a, 17b displaced in a transverse direction, and having one peripheral surface 17c extending between them, the peripheral surface 17c being generally circular in profile. The inner body 14 comprises a pair half portions 14a, 14b, which when combined form the inner body 14 as a whole. FIGS. 7a and 7b show the two half portions 14a, 14b of the inner body 14, which have a substantially semi-cylindrical shape.

Each half portion has a substantially flat contacting face 18 which is arranged to abut the corresponding contacting face 18 of the other half portion. Accordingly an end of the blade unit 6 may be sandwiched between the corresponding contacting face 18 of the pair of half portions 14a, 14b so as to securely clamp the blade unit 6 within the inner body 14 of the clamping unit 7. Each contacting face 18 of the two half portions 14a, 14b has a recess 19, such that when the two contacting faces 18 of the pair of half portions 14a, 14b are brought into contact, the pair of recesses 19 define an aperture 20, which is shaped and configured to retain an end of the blade unit 6.

Figure 8A:
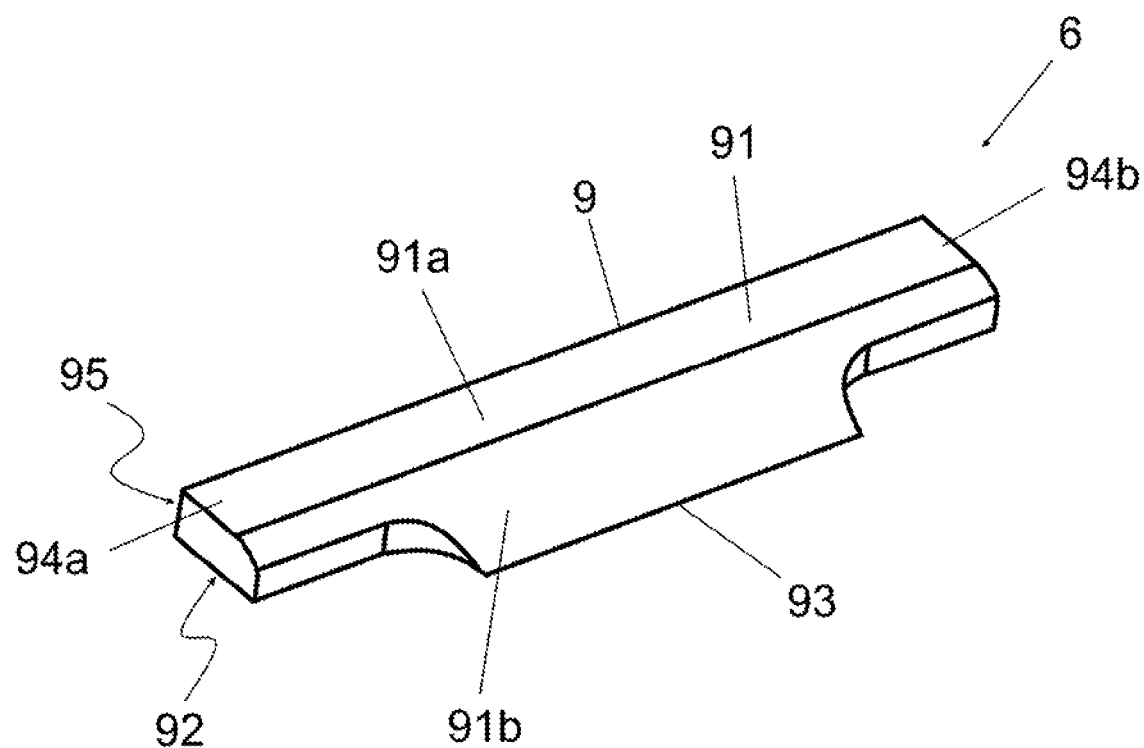
FIG. 8a is a front perspective view of a blade unit according to one embodiment of the present invention.
Figure 8C:
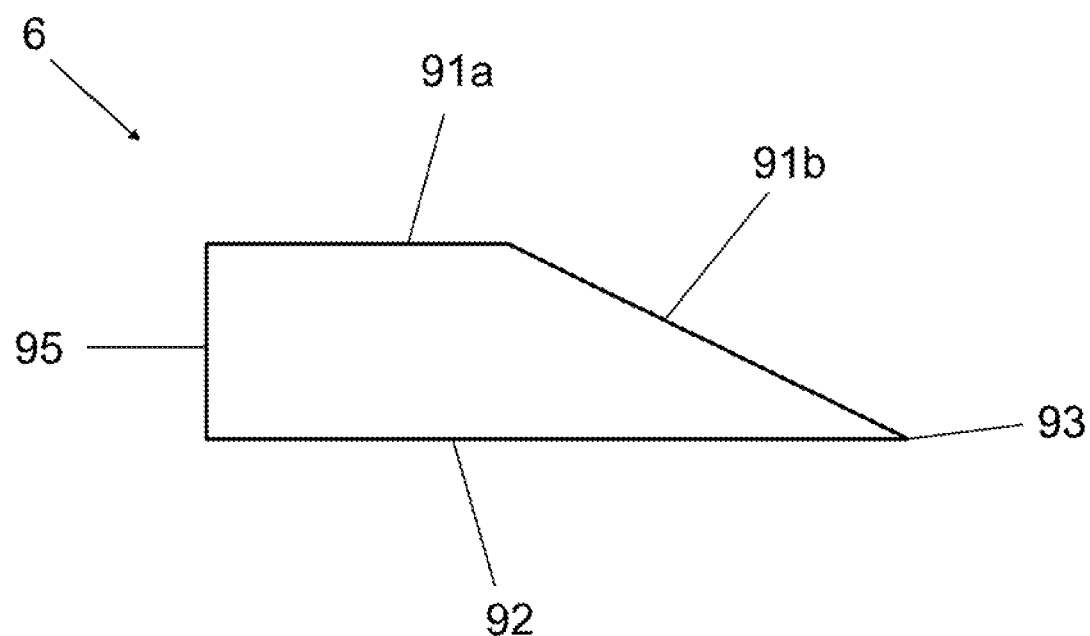
FIG. 8c is a cross-sectional view of the blade unit of FIGS. 8a and 8b along line C-C of FIG. 8b.
Figure 8B:
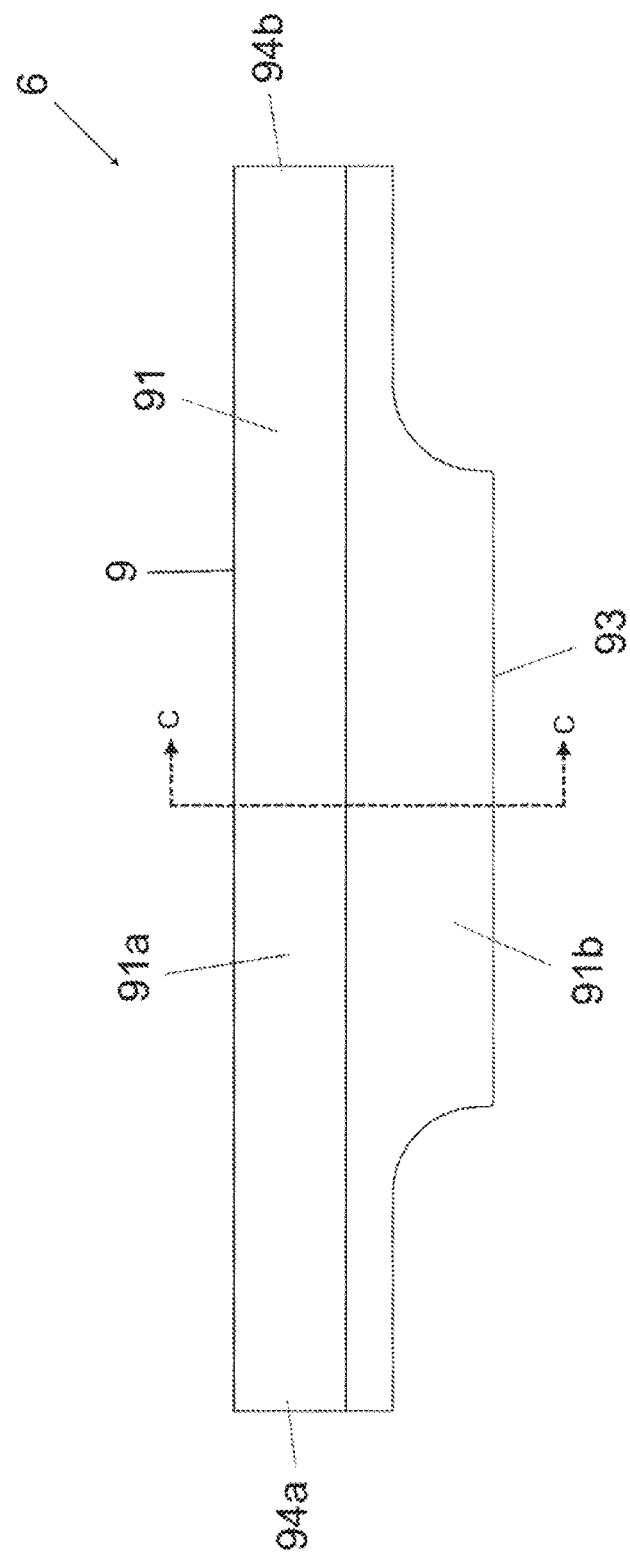

FIGS. 8a to 8c show a blade unit 6 according to one embodiment of the present invention. In the illustrated embodiment, blade unit 6 comprises a blade 9 formed as a single piece from hardened steel. Blade 9 comprises, in use, an upper surface 91 and a lower surface 92. Upper surface 91 comprises a flat portion 91a, which is substantially parallel to the lower surface 92, and a bevelled portion 91b which is angled towards lower surface 92. Accordingly, the point at which bevelled portion 91b of upper surface 91 meets the lower surface 92 defined a cutting edge 93 of the blade. Lower surface 92 is substantially planar, such that the cross sectional profile of the blade 9 has a 'wedge' or 'chisel' shape, as shown in FIG. 8c. Back surface 95 extends between flat portion 91a of upper surface 91 and lower surface 92.

In the illustrated embodiment, cutting edge 93 extends across only a portion of the length of blade 9. Blade 9 comprises two end portions 94a and 94b at which bevelled portion 91b of upper surface 91 does not extend to meet lower surface 92 to form a cutting edge. The cross sectional profile of end portions 94a and 94b is shaped and sized to fit within aperture 20 defined by pair of recesses 19 of inner body 13. Accordingly, each of the end portions 94a, 94b can be inserted into an aperture 20 of a respective clamping unit 7, such that blade 9 is securely retained by each clamping unit 7.

Figure 5:
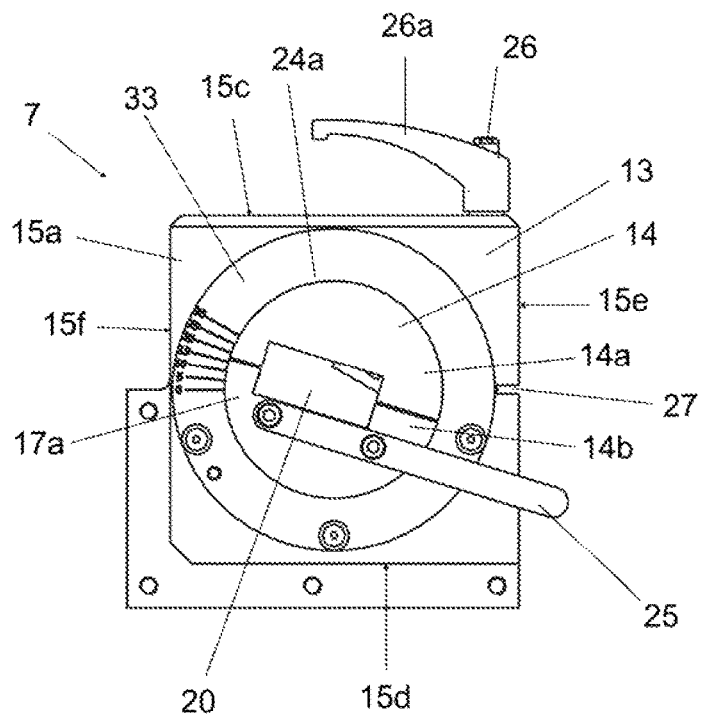
FIG. 5 is a side elevation of an outer-facing side face of a clamping unit according to one embodiment of the present invention.
Figure 6:
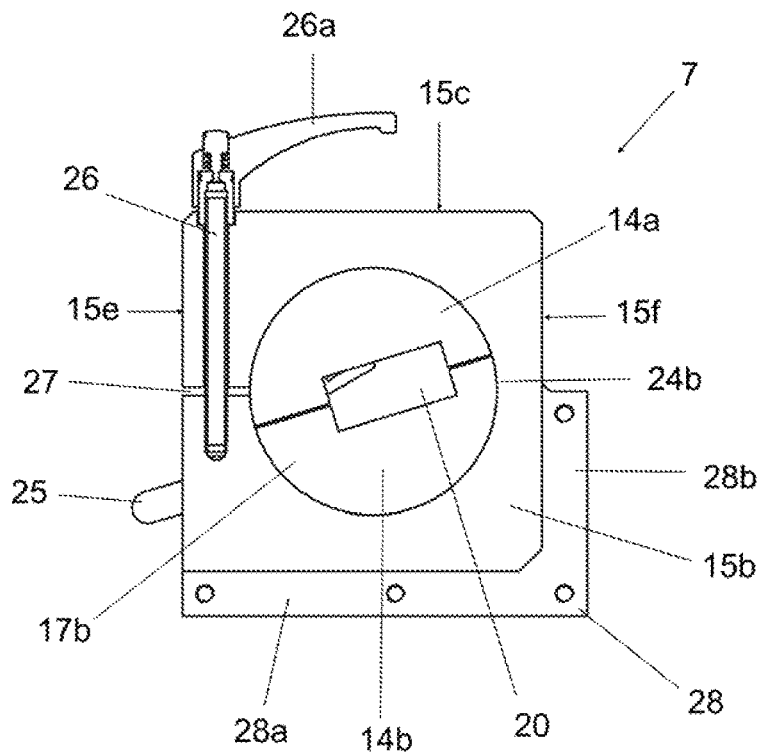
FIG. 6 is a side elevation of an inner-facing side face of the clamping unit of FIG. 5.
Figure 9:
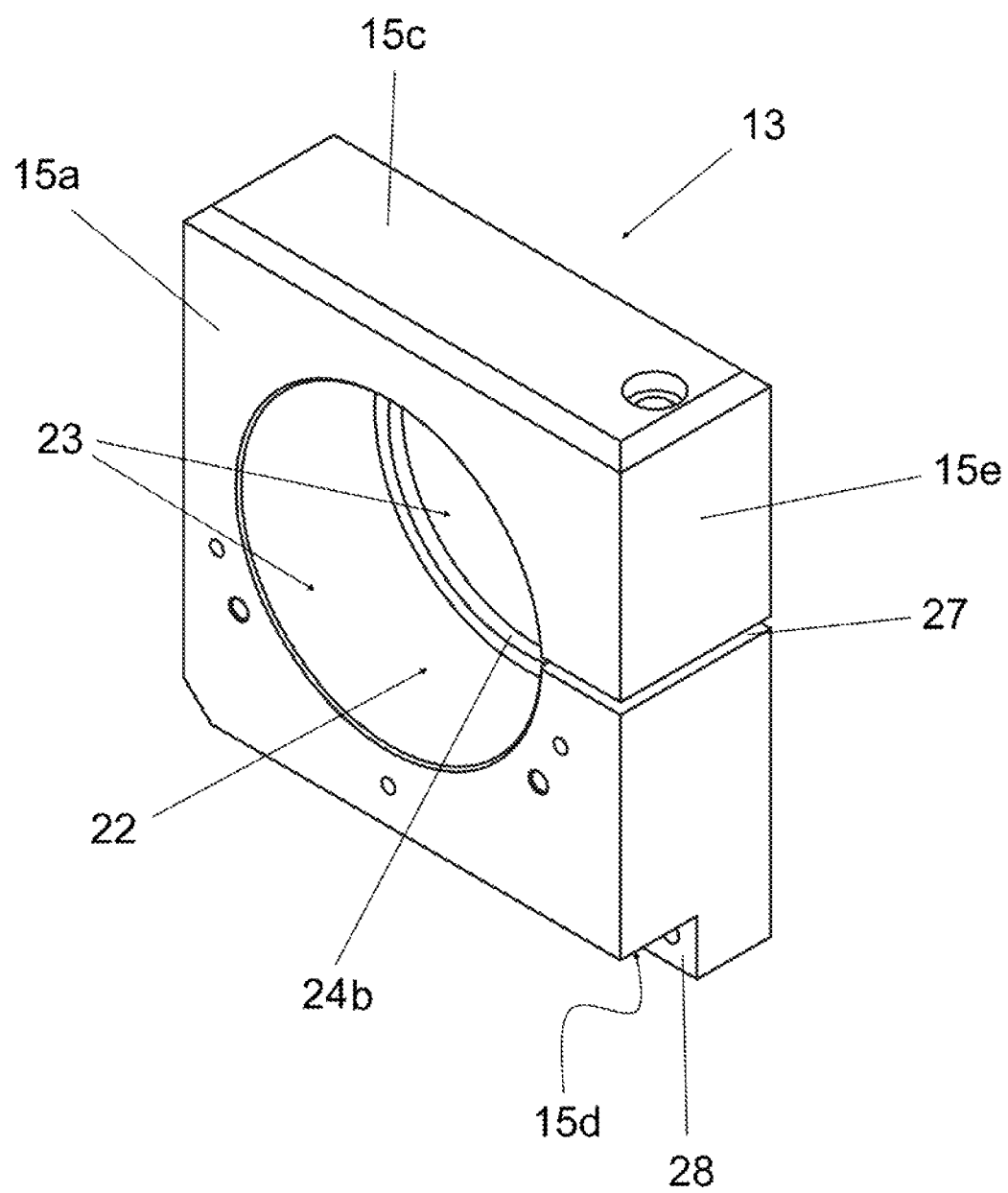
FIG. 9 is a side perspective view of the outer body of the clamping unit according to one embodiment of the present invention.

As shown in FIG. 9, the outer body 13 comprises a cavity 22 shaped and configured to receive the inner body 14, inside of which the inner body 14 is positioned as shown in FIGS. 5 and 6. An opening 23 is provided in each of the two opposing side surfaces 15a, 15b of the outer body 13 for exposing the inner body 14.

Each of the two opposing side surfaces 15a, 15b of the outer body 13 also comprises a lip 24a, 24b extending around the periphery of the opening 23. Each lip 24a, 24b is arranged to overlap a corresponding side surface 17a, 17b of the inner body 14, which assists in retaining the inner body 14 within the outer body 13. This helps to provide a secure and stable clamping unit structure.

On the outwardly-facing side surface 15a of the outer body 13, as shown in FIG. 5, a ring 33 is formed separately from the outer body 13 and is attached thereto. Ring 33 overlaps the periphery of the opening 23 formed in the outwardly-facing side surface 15a, so as to form lip 24a, which protrudes outwardly from the plane of the outwardly-facing side surface 15a. Outer body 13 is shown in FIG. 9 without ring 33 attached. On the inwardly-facing side surface 15b of the outer body 13, as shown in FIG. 6, lip 24b is formed integrally with the outer body 13 and is substantially flush with the plane of the inwardly-facing side surface 15b. When the inner body 14 is positioned within the cavity 22 of the outer body 13, the two lips 24a, 24b formed around the periphery of the opening 23 on each of the two opposing side surfaces 15a, 15b assist in retaining and bracing the inner body 14 within the outer body 13.

The cylindrical shape of the inner body 14 allows the inner body 14 to be rotated within the outer body 13. Accordingly, a cutting angle of the blade 9 can be adjusted by rotation of the two inner bodies of the two clamping units 7 positioned on the two opposing side walls 3a, 3b of the frame 2. To assist the rotation of the inner body 14 within the outer body 13, the inner body 14 is provided with a handle 25 on the outwardly-facing side surface 17a of the inner body 14.

To allow rotation of the inner body 14 within the outer body 13, the inner body 14 is loosely housed within the outer body 13. To fix the position and orientation of the inner body 14 in preparation for carrying out a cutting operation, the clamping unit 7 also comprises a means for securing the inner body 14 within the outer body 13 in a fixed position and orientation. This prevents movement or rotation of the inner body 14 once the securing means have been operated. In the illustrated embodiment, the clamping unit 7 comprises a screw mechanism 26 associated with the outer body 13.

A slit 27 is formed in the outer body 13 which extends from one of its outer edge faces, in this case the front edge face 15e, to the cavity 22. Slit 27 lies in a substantially horizontal plane of the apparatus and is formed at an approximate mid-point between upper edge face 15c and lower edge face 15d of outer body 13.

Screw mechanism 26 extends through the upper edge face 15c of the outer body into the front portion of the outer body 13 and has a vertical axis, which is centred approximately at a mid-point between the outer-facing edge face 15a and the inner-facing edge face 15b of the outer body 13. The vertical axis of screw mechanism 26 is substantially parallel to outer-facing edge face 15a, inner-facing edge face 15b, and front and rear edge faces 15e, 15f, and is substantially perpendicular to upper and lower edges faces 15c and 15d. The screw mechanism 26 is arranged to extend through the front portion of the outer body 13 and through the slit 27, which divides the front portion of the outer body into two portions. When the screw mechanism 26 is tightened, the two portions of the outer body 13, which are located on either side of the slit 27, are forced together. This tightens the outer body 13 around the inner body 14, and thus secures the inner body 14 in a fixed position and orientation. In order to subsequently adjust the cutting angle of the blade 9, the screw mechanism 26 can be unscrewed to separate the two portions of the outer body 13 divided by the slit 27 and to allow the inner body 14 to rotate. The cutting angle can then be adjusted by rotating the inner body 14 to the desired position and the screw mechanism 26 can again be tightened to force the two portions of the outer body together and fix the inner body 14 in the desired orientation. To facilitate tightening and untightening of the screw mechanism 26, a handle 26a is provided on a portion of the screw mechanism 26 which extends above the upper edge face 15c of the outer body 13.

In order to brace the clamping unit 7 against the side wall 3b of the frame 2, each clamping unit 7 is provided with at least one flange 28. In the embodiment shown in FIG. 6, the flange 28 extends downwardly from the lower edge face 15d of the outer body 13 and rearwardly from the rear edge face 15f of the outer body 13. The flange 28 extends beyond the upper edge 10 of the side wall 3b and lies adjacent to an inwardly-facing side surface 29 of the side wall 3b. A plurality of bolts 30 are arranged to extend through the flange 28 into the side wall 3b of the frame 2, thus securing the clamping unit 7 to the side wall 3b of the frame 2. The thickness of the flange 28 is approximately half the total thickness of the clamping unit 7 and is approximately equal to the thickness of the side wall 3b.

Figure 10A:
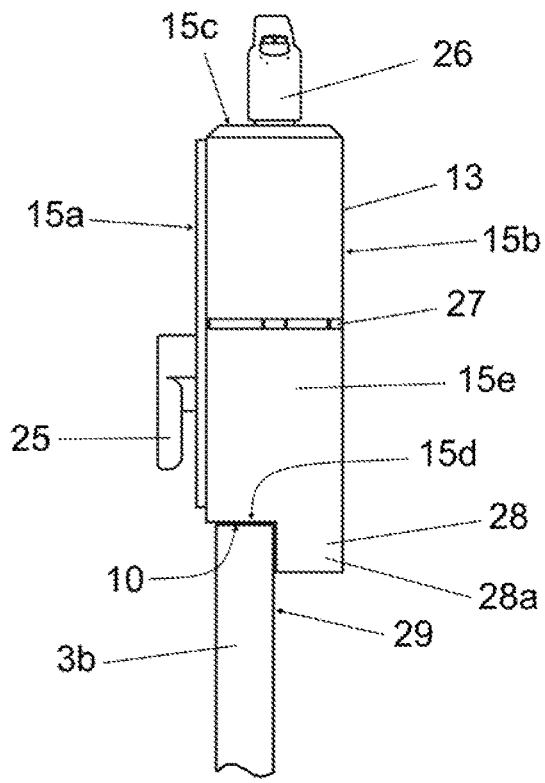
FIG. 10a is a front side elevation of the clamping unit of FIG. 4, showing a front peripheral surface of the outer body of the clamping unit.
Figure 10B:
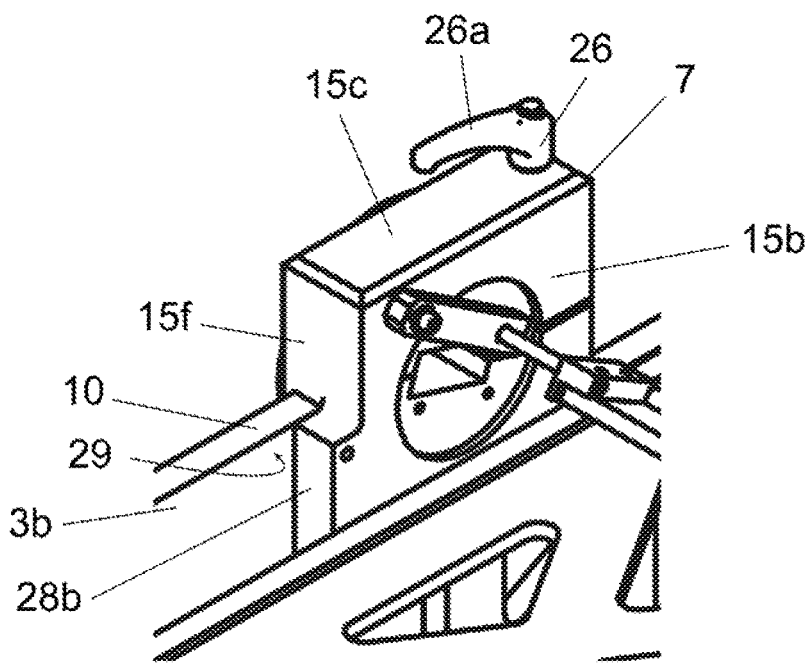
FIG. 10b is an enlarged view of FIG. 1, showing the clamping unit fixed to the side wall of the frame.

FIGS. 10a and 10b show the front and rear edge faces 15e, 15f of the outer body 13, respectively, and illustrate the interaction of the flange 28 with the side wall 3b of the frame 2. When viewed in the longitudinal direction of the apparatus, the lower edge face 15d of the outer body 13 and the flange 28 form a stepped profile (FIG. 10a). When the clamping unit 7 is positioned on the side wall 3b, the lower edge face 15d is supported by the upper edge 10 of the side wall 3b, and a first portion 28a of the flange 28 which extends from the lower edge face 15d abuts the inwardly-facing side surface 29 of the side wall 3b. First flange portion 28a extends approximately along the entire length of the lower edge face 15d of the outer body 13, such that a front end of the first flange portion 28a is substantially flush with the front edge face 15e of the outer body 13 (FIG. 6).

The rear edge face 15f of the clamping unit 7 is supported by the substantially vertically-extending portion 12 of the upper edge 10 of the side wall 3b and a second portion 28b of the flange 28, which extends from the rear edge face 15f of the outer body 13, abuts the inwardly-facing side surface 29 of the side wall 3b as shown in FIG. 10b, thus bracing the clamping unit 7 against the side wall 3b. Second flange portion 28b extends along approximately half the vertical height of the rear edge face 15f of the outer body 13. Accordingly, second flange portion 28b extends vertically to approximately the same level as the substantially vertically-extending portion 12 of the upper edge 10 of the side wall 3b. Thus, the upper edge 10 of the side wall 3b directly adjacent the substantially-vertically extending portion 12 to the rear of the substantially vertically-extending portion 12 is at approximately the same level as the uppermost part of the second flange portion 28b.

According to the described structure, flange 28 is preferably provided adjacent any portion of the edge faces of outer body 13 which is abutted and supported by upper edge 10. Thus, in any position at which upper edge 10 abuts and supports an edge face of outer body 13, flange 28 may also be provided on the outer body 13 to brace against a side surface of the side wall 3b. This arrangement of the flange assists in the dispersion of forces experienced by the blade unit 6 during the sectioning operation throughout the whole frame structure, via the clamping unit 7.

A sectioning operation carried out on a tissue specimen using the sectioning apparatus 1 of the present invention will now be described.

A tissue specimen such as a whole human brain is mounted on the specimen stage 8. Initially the specimen stage 8 is positioned in a starting position towards the front end 4 of the apparatus 1, such that the tissue specimen is not in contact with the blade 9. The vertical height of the specimen stage 8 is adjusted by the drive mechanism to a desired position. In order for a section of the tissue specimen to be cut, the top surface of the tissue specimen should overlap the cutting edge of the blade 9 in a vertical direction. The amount of overlap between the two surfaces of the tissue specimen and the cutting edge of the blade 9 will determine the thickness of the first section to be cut. When the vertical height of the tissue specimen has been set to a desired position, the specimen stage 8 is advanced in the longitudinal direction towards the rear end 5 of the apparatus 1. The tissue specimen is brought into contact with the cutting edge of the blade 9, and as the specimen stage 8 continues to advance in a longitudinal direction, a section is cut from the tissue specimen. Once the specimen stage 8 has advanced sufficiently for the blade 9 to have cut through the entire tissue specimen, the detached section of tissue specimen can be transferred to a receiving surface (such as a glass slide) mounted to the rear side of the blade unit 6.

In preparation for cutting the next section of tissue specimen, the specimen stage 8 is reversed in the longitudinal direction towards the front end 4 of the apparatus 1. In order to avoid accidental contact of the tissue specimen with the edge of the blade 9 during the reverse motion, the vertical height of the specimen stage 8 may be adjusted to a lower position using the drive mechanism before the specimen stage 8 is reversed in a longitudinal direction. Once the specimen stage 8 is returned to the starting position, the vertical height of the specimen stage 8 is again adjusted such that the top surface of the tissue specimen overlaps the cutting edge of the blade 9 in a vertical direction by an amount corresponding to the desired thickness of the next section to be cut. The specimen stage 8 is again advanced in a longitudinal direction towards the rear end 5 of the apparatus 1 and a second section of tissue specimen is cut as the tissue specimen comes into contact with the blade 9. This process is repeated until the desired number of sections have been cut.

A typical thickness of a section of tissue specimen is approximately 25 μm, which would allow an average human brain to be sectioned into approximately 6000 slices. To achieve this thickness, the vertical height of the specimen stage 8 is adjusted such that there is a 25 μm overlap between the top surface of the tissue specimen and the edge of the blade 9 for each sectioning step as described above.

The use of a low-torque step motor in the drive mechanism allows the specimen stage 8 to be advanced in very small increments, meaning that thinner sections can be sliced. For example, sections having a thickness of 5 μm can be obtained using the sectioning apparatus of the present invention.

As discussed, the sectioning apparatus is designed to slice a frozen tissue specimen and thus, in order to prevent the tissue specimen from thawing during the sectioning operation, the entire sectioning apparatus may be positioned within a cryostat. The cryostat is capable of cooling the apparatus to temperatures to as low as −60° C. It will be appreciated that a brain specimen cryogenically frozen in such a manner will have a significant hardness. Thus, during the sectioning operation, a substantial force is exerted on the blade unit as the frozen tissue specimen comes into contact with the blade. The structural arrangement of the sectioning apparatus of the present invention allows the forces exerted on the blade to be readily dispersed throughout the entire apparatus, including the frame. This substantially eliminates any vibration experienced by the blade, which in turn means that the sections cut from the tissue specimen are not prone to forming defects such as tears or rips during sectioning. Thus, the quality of the sections of tissue specimen which are produced using the sectioning apparatus of the present invention is significantly improved. This is greatly advantageous for subsequent analysis of the sections of tissue specimen, such as imaging the sections using the camera mounted to the apparatus as described.

The invention has been described above with reference to a specific embodiment which is given by way of example only. It will be appreciated that many different arrangements of the invention are possible which fall within the scope of the appended claims.

The invention claimed is:

1. An apparatus for sectioning frozen tissue specimens, comprising:
   a frame having two opposing side walls extending in a longitudinal direction of the apparatus;
   a blade unit mounted between the side walls of the frame in a transverse direction of the apparatus;
   a clamping unit integral with or fixed to each side wall of the frame that is adapted to clamp one end of the blade unit and to secure said end of the blade unit to said side wall of the frame;
   a specimen stage for mounting a tissue specimen; and
   a drive mechanism for providing relative movement between the specimen stage and the blade unit in use of the apparatus;
   wherein the clamping unit has a dimension in the transverse direction that is greater than a dimension of the side wall of the frame in the transverse direction,
   wherein each side wall of the frame has a longitudinally-extending edge which, in use, is at an upper part of the apparatus; a cutaway portion is formed along an upper edge of each side wall of the frame to accommodate at least part of the clamping unit, the cutaway portion being formed through the full extent of the side wall in the transverse direction; and the clamping unit is mounted on the cutaway portion, and
   wherein the clamping unit comprises at least one flange arranged to extend beyond the upper edge of the side wall and lie immediately adjacent the side wall in the transverse direction, the apparatus further comprising a plurality of fastening means arranged to extend through the or each flange into the side wall so as to secure the clamping unit to the side wall.

2. A sectioning apparatus according to claim 1, wherein, at the cutaway portion of the side wall, the upper edge of the side wall has a substantially L-shaped profile or a substantially U-shaped profile when the side wall is viewed in the transverse direction.

3. A sectioning apparatus according to claim 1 wherein, in use, the level of the upper edge of the side wall is not constant along the length of the side wall and there is at least one change in level of the upper edge at the cutaway portion.

4. A sectioning apparatus according to claim 2, wherein each cutaway portion is configured in the form of a step.

5. A sectioning apparatus according to claim 1, wherein each clamping unit comprises first and second portions, and wherein the blade unit is arranged to be clamped at its ends between the first and second portions of each clamping unit.

6. A sectioning apparatus according claim 1, wherein the blade unit comprises a blade having, in use, opposing upper and lower surfaces, a cutting edge formed at a point at which the opposing upper and lower surfaces meet, and a body portion located behind the cutting edge, and wherein the body portion of the blade has a thickness between the opposing upper and lower surfaces of at least 16 mm.

7. A sectioning apparatus according claim 1, wherein the drive mechanism comprises a low torque stepper motor and optionally a worm screw.

8. A sectioning apparatus according to claim 1, further comprising a receiving surface for receiving a section of tissue.

9. A sectioning apparatus according to claim 1, wherein each clamping unit has at least six faces, with at least two opposing side faces lying in planes which are substantially parallel to the side wall of the frame and at least four edge faces lying in planes which are generally perpendicular to the planes of the side faces.

10. A sectioning apparatus according to claim 9, wherein, in use, the at least four edge faces comprise opposing upper and lower edge faces lying in planes substantially parallel to an upper edge of the side wall, and opposing front and rear edge faces lying in planes substantially perpendicular to the planes of the opposing side faces and the planes of the opposing upper and lower edge faces.

11. A sectioning apparatus according to claim 10, wherein the side wall of the frame is arranged to abut the rear edge face of the clamping unit along at least a quarter of the vertical height of said rear edge face.

12. A sectioning apparatus according to claim 10, wherein the side wall of the frame is arranged to abut the rear edge face of the clamping unit along at least half of the vertical height of said rear edge face.

13. A sectioning apparatus according to claim 1, wherein each clamping unit comprises an outer body and an inner body accommodated within the outer body, the inner body being adapted to contact an end of the blade unit.

14. A sectioning apparatus according to claim 13, wherein the inner body is rotatable within the outer body and is optionally cylindrical.

* * * * *